United States Patent [19]
Yamazaki

[11] Patent Number: 5,212,573
[45] Date of Patent: May 18, 1993

[54] INPUT PROTECTION CIRCUIT OF ELECTRO-OPTICAL DEVICE

[75] Inventor: Tsuneo Yamazaki, Tokyo, Japan
[73] Assignee: Seiko Instruments Inc., Japan
[21] Appl. No.: 438,712
[22] Filed: Nov. 17, 1989
[30] Foreign Application Priority Data
  Nov. 18, 1988 [JP] Japan .................. 63-293258
[51] Int. Cl.$^5$ ............................................. G02F 1/13
[52] U.S. Cl. ..................................... 359/54; 359/57;
        359/58; 359/87; 257/356
[58] Field of Search .............. 350/332, 333; 340/784;
        361/111, 91; 357/23.13, 23.7, 51; 359/54, 57,
                                                  58, 87, 88

[56] References Cited

U.S. PATENT DOCUMENTS

| | | | |
|---|---|---|---|
| 4,527,213 | 7/1985 | Ariizumi | 361/91 |
| 4,789,857 | 12/1988 | Maurice | 340/784 |
| 4,802,054 | 1/1989 | Yu et al. | 357/23.13 |
| 4,803,536 | 2/1989 | Tuan | 357/23.7 |
| 4,810,864 | 3/1989 | Takahashi | 361/91 |
| 4,871,234 | 10/1989 | Suzuki | 350/333 |
| 4,945,352 | 7/1990 | Ejiri | 340/784 |
| 5,019,002 | 5/1991 | Holmberg | 357/23.13 |
| 5,068,748 | 11/1991 | Ukai et al. | 359/87 |

FOREIGN PATENT DOCUMENTS

| | | | |
|---|---|---|---|
| 0202092 | 11/1986 | European Pat. Off. | 359/57 |
| 0369828 | 5/1990 | European Pat. Off. | 359/54 |
| 59-160124 | 9/1984 | Japan | 350/332 |
| 60-151612 | 8/1985 | Japan | 350/333 |
| 61-32561 | 2/1986 | Japan | 357/23.13 |
| 61-59424 | 3/1986 | Japan | 350/333 |
| 61-159621 | 7/1986 | Japan | 340/784 |
| 61-162028 | 7/1986 | Japan | 350/332 |
| 61-296331 | 12/1986 | Japan | 350/333 |
| 62-58226 | 3/1987 | Japan | 359/54 |
| 62-66231 | 3/1987 | Japan | 359/54 |
| 63-55530 | 3/1988 | Japan | 350/332 |
| 63-198021 | 8/1988 | Japan | 359/62 |

Primary Examiner—Rolf Hille
Assistant Examiner—Minhloan Tran
Attorney, Agent, or Firm—Bruce L. Adams; Van C. Wilks

[57] ABSTRACT

The electro-optical device is constructed in the form of an active matrix liquid crystal display device utilizing nonlinear resistive elements. As input protective element is disposed between adjacent input electrodes of the device so as to protect the nonlinear resistive elements in the electro-optical device against excessive input and electrostatic voltage.

15 Claims, 7 Drawing Sheets

INPUT PROTECTION CIRCUIT OF ELECTRO-OPTICAL DEVICE

BACKGROUND OF THE INVENTION

The present invention relates to an input protection circuit for an electro-optical device such as an active matrix liquid crystal display device provided with nonlinear elements for respective picture elements.

An example of the conventional electro-optical device is shown in FIG. 2 in which an shows equivalent circuit of an active matrix liquid crystal display device utilizing nonlinear resistive elements of the two-terminal type is shown. The device shown in FIG. 2 includes a row electrode group 11 and a column electrode group 12, each containing normally 100 to 1000 electrodes. A pair of a liquid crystal cell 13 and a nonlinear element 14 are formed in series at each intersection of the row electrodes and the column electrodes. When a voltage is applied across the pair to drive the liquid crystal cell 13, the nonlinear element 14, having a specific equivalent resistance and equivalent capacitance, undergoes abrupt change of its resistance so that the liquid crystal cell, 13 exibits considerably sharp turning-on characteristics as compared to the case where the liquid crystal cell is driven alone. FIG. 3A is a structural diagram of a substrate formed with a picture element containing the nonlinear resistive element of FIG. 2, and FIG. 3B is a structural section taken along line A—A' of FIG. 3A. The nonlinear resistive element is comprised of a silicon nitride film 16 composed of a compound of silicon and nitrogen and having nonlinear current-voltage characteristics, the element is formed on a transparent picture element electrode 15 made of ITO(indium tin oxide) etc, under a row electrode 17 comprised of a metal film disposed on a glass substrate 18.

FIG. 4 shows the current-voltage characteristic of the nonlinear resistive element disposed between the transparent picture element electrode 15 and the row electrode 17. In FIG. 4, the abscissa indicates applied voltage and the ordinate indicates current flowing into the element in logarithmic terms. The graph shows the sharp current-voltage characteristic. The row electrode 17 is floated with respect to the earth potential. Therefore, when electrostatic charge is applied to the electrode in the order of several thousands volts, the voltage is imposed directly on the nonlinear element to thereby destroy the element which has electrostatic withstanding voltage of 20 through 50 V. Thus, it is difficult to maintain the production yield rate and ensure the reliability of device.

SUMMARY OF THE INVENTION

In view of the drawback of the prior art, an object of the present invention is to provide an electro-optical device of the type utilizing nonlinear two-terminal elements having high production yield rate and high reliability while being protected from electrostatic destruction during and after the fabrication process without additional production steps.

In order to realize the object, according to the present invention, a plurality of nonlinear resistive elements which are identical to those used in the picture elements are connected in series between the row electrodes to function as an electrostatic protection circuit. Or, a common electrode is provided in the periphery of the device and a plurality of nonlinear resistive elements which are identical to those used in the picture elements are connected in series between the common electrode and the respective row electrodes.

As shown in FIG. 4, the nonlinear element exhibits remarkable nonlineality in its current-voltage characteristic such as $10^{-12}$ A at 2 V and $10^{-6}$ A at 10 V, hence the series-connected elements have a high resistance of more than $10^9$ for 20 through 30 V across their terminals 1 which is sufficiently great with respect to output impedance of a driving circuit. In turn, they have a resistance of less than $10^6$ at a voltage of more than several hundreds volts, effective to release applied electrostatic charge through the adjacent electrodes.

Further, when the respective electrodes are connected to the common electrode through the nonlinear resistive elements, electrostatic charge applied to a particular electrode can be released to the common electrode.

DETAILED DESCRIPTION OF EMBODIMENTS

Hereinafter, embodiments of the present invention will be described in conjunction with the drawings.

Figure 1:
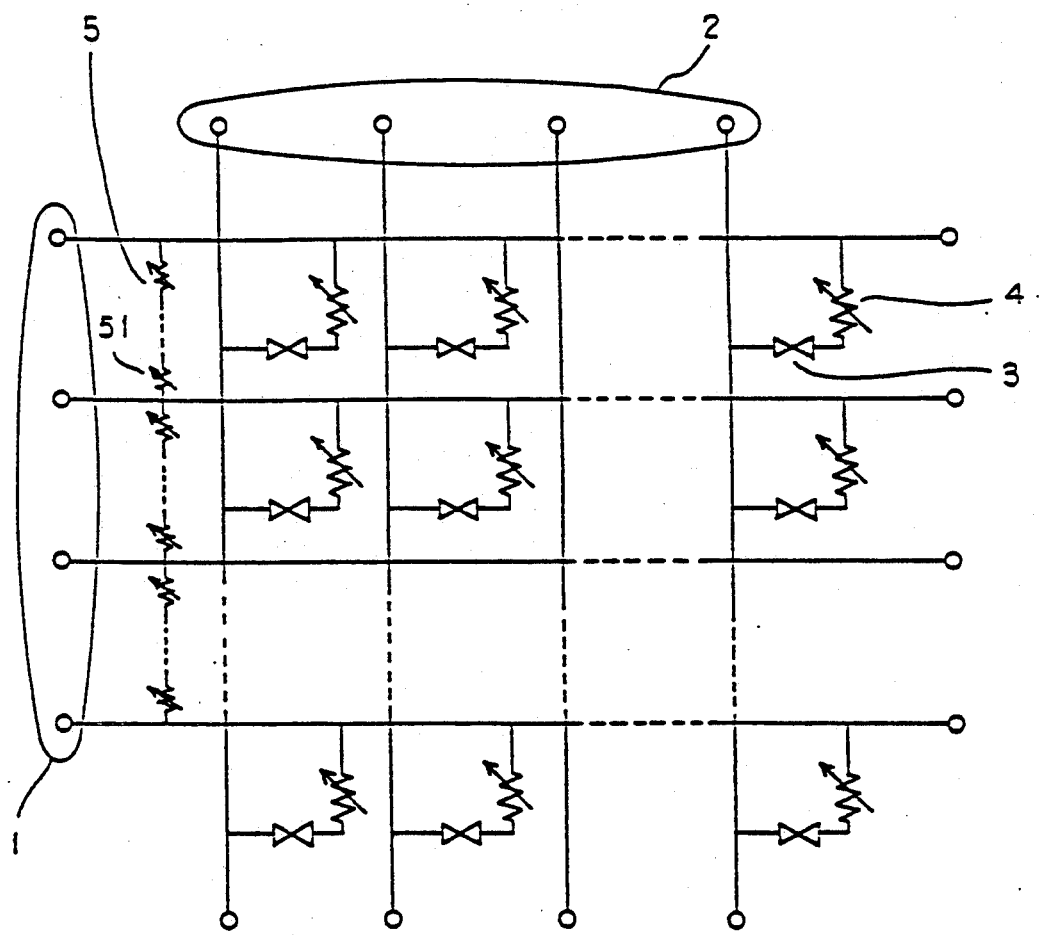
FIG. 1A is an equivalent circuit diagram of a first embodiment of the inventive electro-optical device.
FIG. 1B is a plan view of the first embodiment of the inventive electro-optical device.
FIG. 1C is a sectional view taken along line B—B' of FIG. 1B.

FIG. 1A show an equivalent circuit diagram of a first embodiment of the inventive matrix liquid crystal display device. The device includes a row electrode group 1, column electrode group 2 and electro-optical or picture elements each composed of a liquid crystal cell 3 and nonlinear resistive switching element 4, those of which are arranged in similar manner to the prior art shown in FIG. 2. Namely, the individual liquid crystal cell 3, nonlinear resistive element 4 and picture element electrode 15 (FIGS. 1A and 1B) connected to the nonlinear resistive element 4 are disposed at each intersection of the row electrodes 1 and the column electrodes 2 so as to provide a display picture element.

A plurality of nonlinear resistive elements 51 are connected in series between adjacent row electrodes 1 which define an input electrode to the nonlinear resistive switching elements 4, such as to define a nonlinear resistive element group 5 operative to function as an input protection circuit. Each element 51 of the nonlinear resistive element group 5 has the same sectional structure as that of the nonlinear resistive element 4 connected to the picture element electrode 15, i.e., the nonlinear resistive element 4 utilized in the picture element.

Figure 1B:
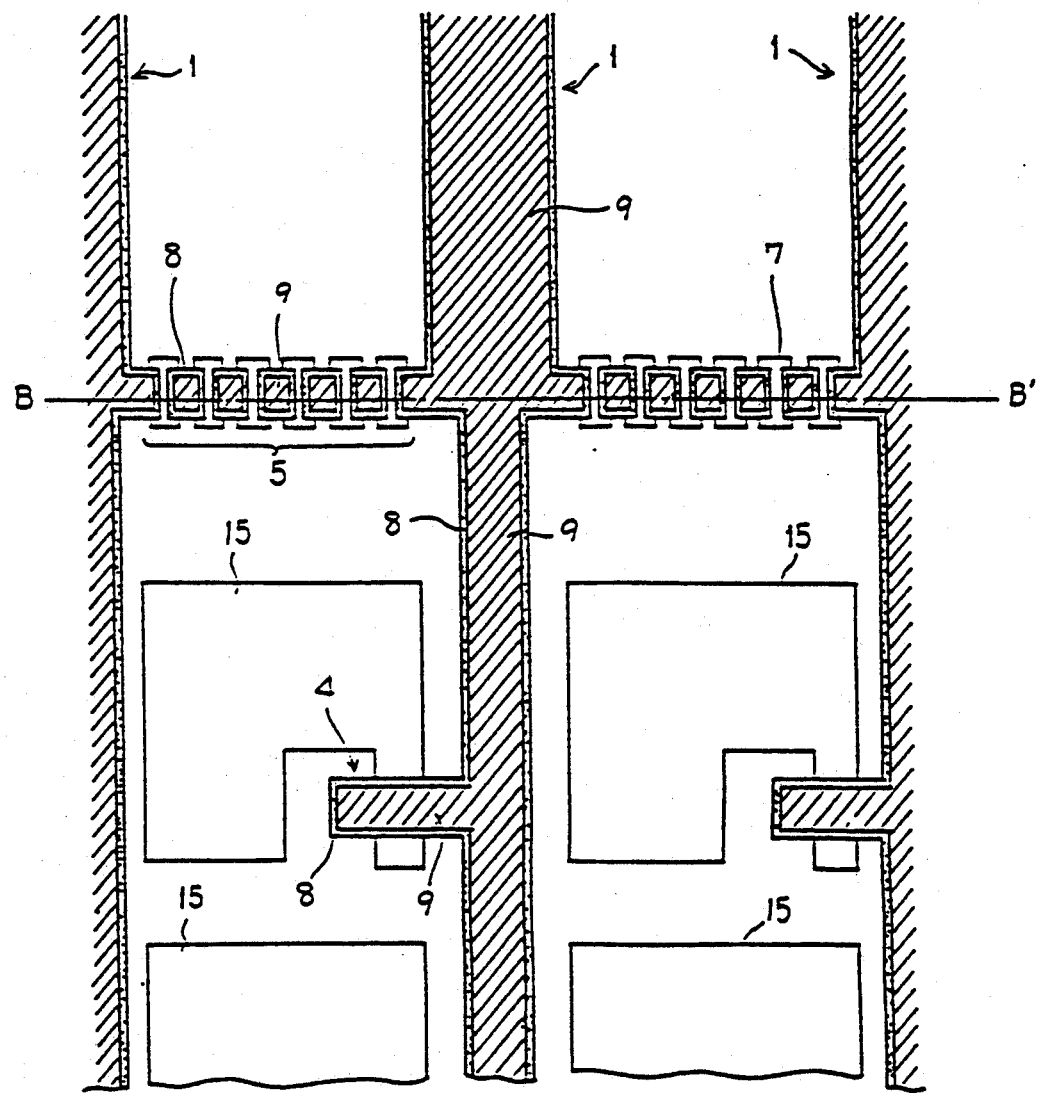
Figure 1C:
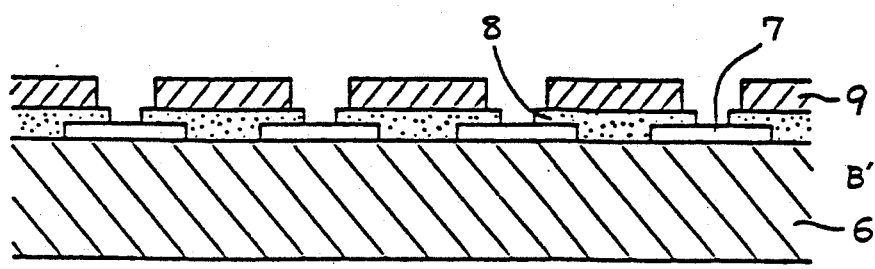
Figure 2:
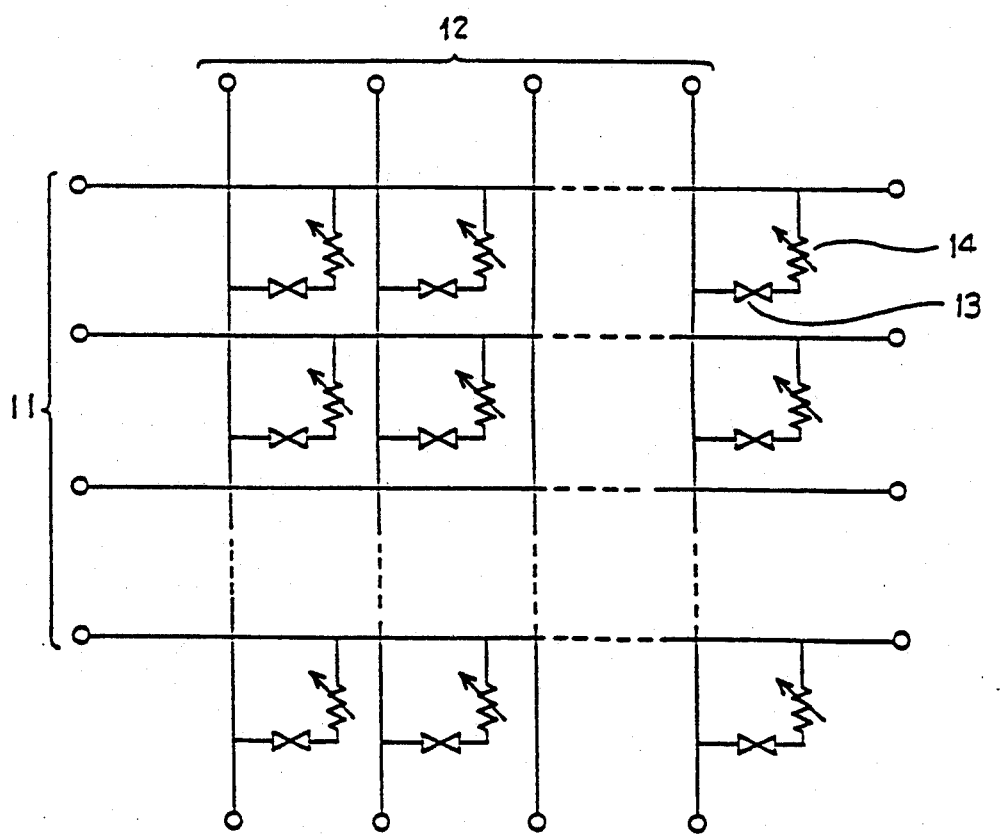
FIG. 2 is an equivalent circuit diagram of the conventional active matrix display device.
Figure 3A:
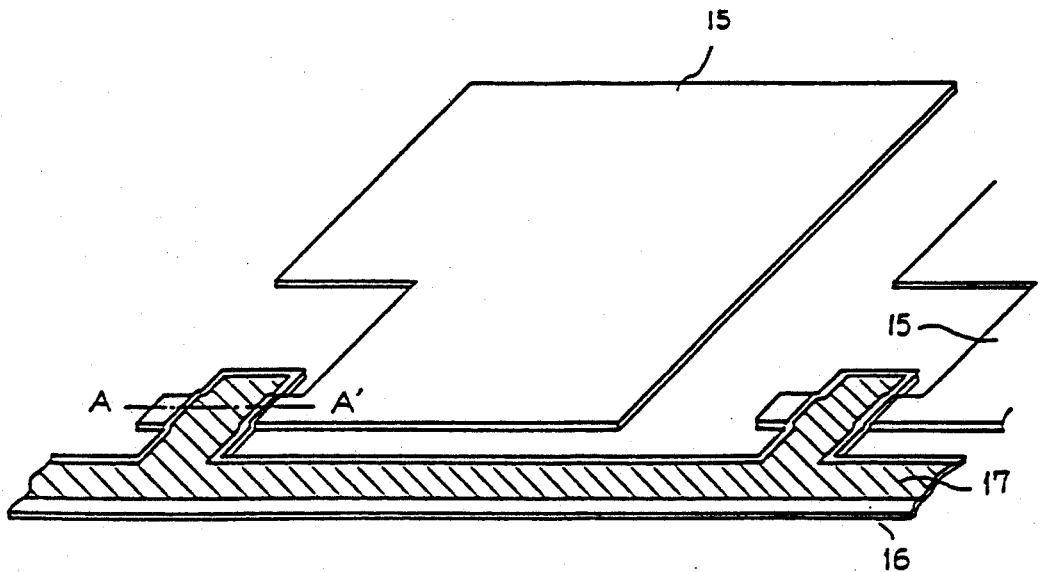
FIG. 3A is a perspective view of a substrate formed with nonlinear elements of the conventional active matrix display device.
Figure 3B:
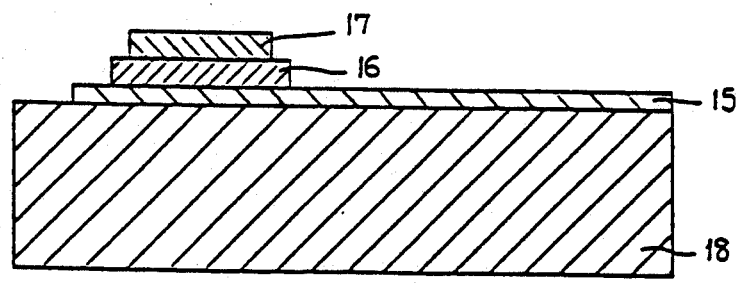
FIG. 3B is a sectional view of the conventional active matrix display device taken along line A—A'.
Figure 4:
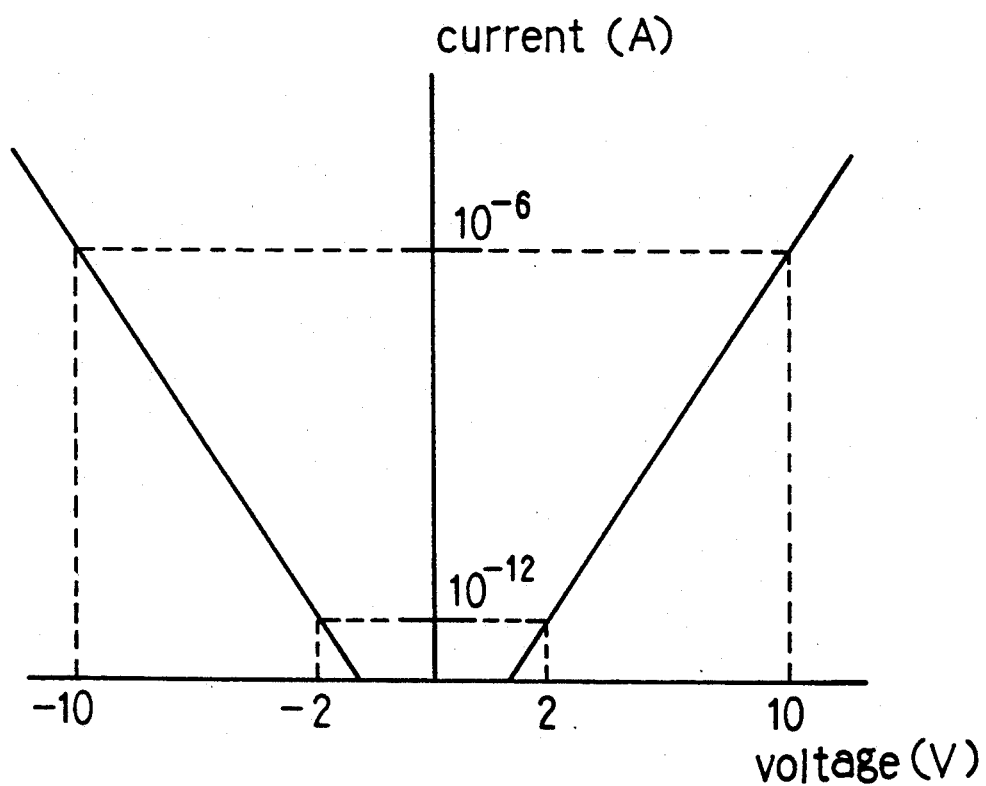
FIG. 4 is a graph showing current-voltage characteristics of the nonlinear element.

FIG. 1B shows a structural plan view of the inventive matrix liquid crystal display device, including the row electrodes and their input terminal portion. FIG. 1C is a structural section diagram taken along line B—B' of FIG. 1B. The nonlinear resistive element group 5 is comprised of electrodes 7 made of a transparent electroconductive film such as ITO (indium tin oxide) and formed on a transparent insulating substrate 6 made of glass etc., nonlinear resistive films 8 formed on and between the electrodes 7, and metal electrodes 9 made of metal such as chromium and aluminum and formed on the respective nonlinear resistive films 8. This region has a different plan view structure (namely, different mask pattern is needed), but has the identical sectional structure to the picture element region such that the nonlinear resistive element group can be formed by the same steps as in the fabrication of the picture element region of the FIG. 3 prior art. Thus, the introduction of the electrostatic protection circuit does not increase the sequence of the production steps. In FIG. 1B, the nonlinear resistive element group is comprised of twelve of the nonlinear resistive elements or members series-connected between adjacent row electrodes such that each nonlinear resistive element is composed of the nonlinear resistive film 8 interposed between the metal electrode 9 and the transparent electroconductive film 7. When carrying out matrix display by applying signal voltage of less than 20 V to the respective row electrodes, a negligible current may flow through the twelve series-connected nonlinear elements 51 between the adjacent input electrodes in the order of $10^{-12}$ A at 24 V. Therefore, the isolation of the signal can be sufficiently ensured between the adjacent input or row electrodes. When excessive input voltage is applied between the adjacent electrodes, for example, on the order of more than $10 \times 12 = 120$ V, the resistance reduces below 12 M to thereby instantly discharge the charge to avoid continuous application of high voltage.

Figure 5:
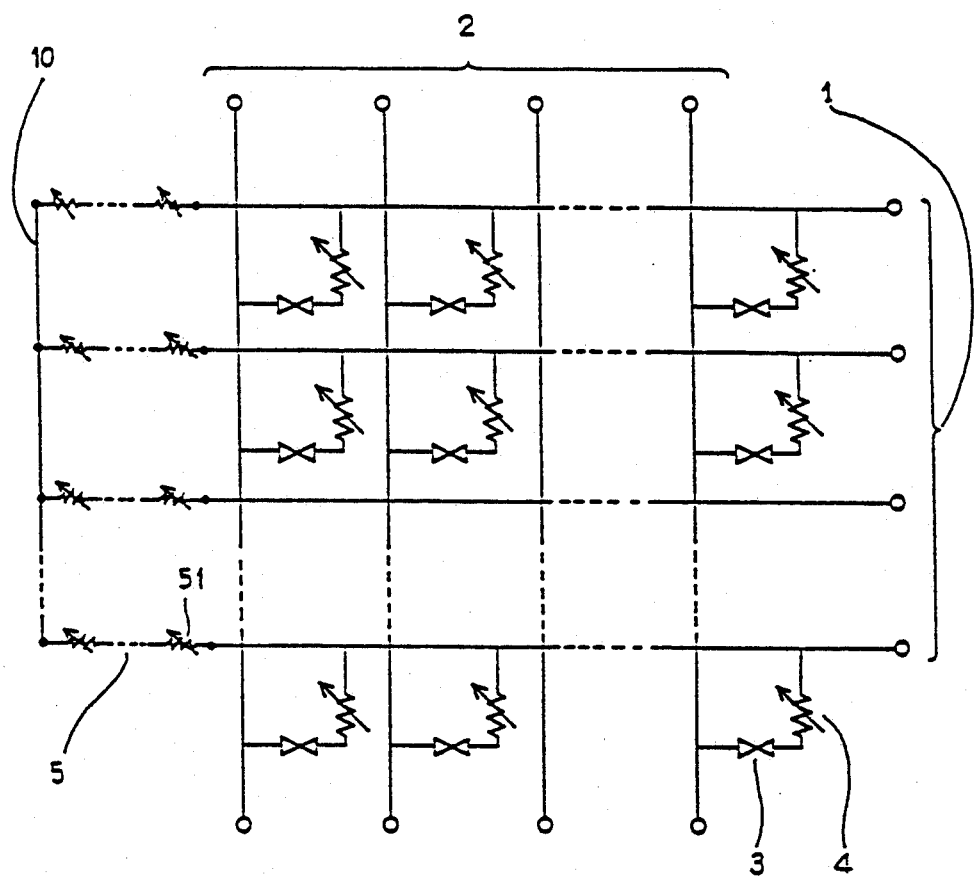
FIG. 5A is an equivalent circuit diagram showing a second embodiment of the present invention.
FIG. 5B is a plan view of the second embodiment.
Figure 5B:
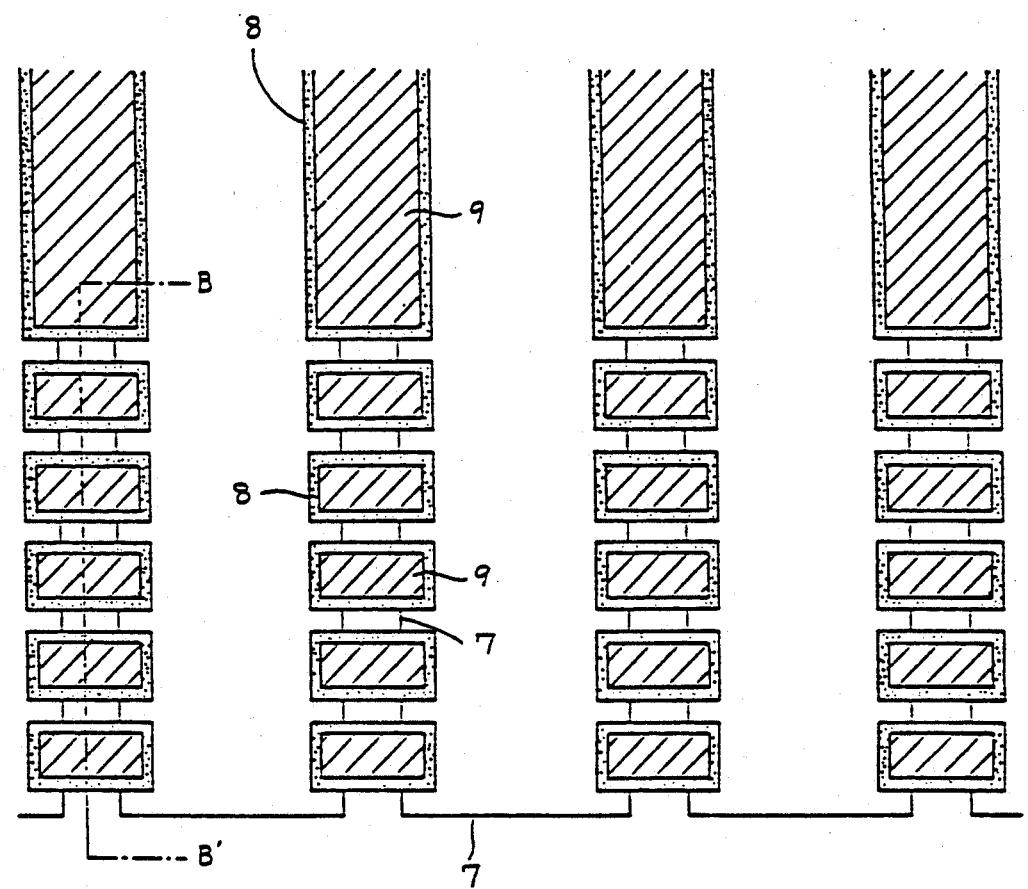

FIGS. 5A and 5B show, respectively, an equivalent circuit diagram and a plan view of a second embodiment of the present invention.

In this embodiment, a common electrode 10 is formed outside the display area which exhibits the electro-optical effect, i.e., formed in the periphery of the device. The respective row electrode 1 is connected to the common electrode 10 through a nonlinear resistive element group 5 composed of a plurality of series-connected nonlinear resistive elements or members 51. In this embodiment, eleven of the nonlinear resistive elements 51 are disposed between the respective row electrode 1 and the common electrode 10. This resistive element 51 has the same sectional structure as that of the nonlinear resistive element 4 connected between the picture element electrode 15 and the row electrode 1 in the first embodiment, and is formed of nonlinear resistive film 8 interposed between a metal electrode 9 and an electrode 7 of transparent electro-conductive film. When applying a signal voltage up to 20 V to the respective row electrodes to effect matrix display, only a negligible current may flow through the eleven series-connected resistive elements between adjacent input electrodes on the order of $10^{-12}$ A at 22 V, so that the signal can be sufficiently separated between the adjacent row electrodes. When excessive voltage of, for example, more than $10 \times 11 = 110$ V is applied between the adjacent row electrodes, the resistance therebetween drops below 11 M to thereby instantly release the charge to avoid continuous application of higher voltage.

Further, since the respective row electrodes are connected to the common electrode, electrostatic charge applied to a row electrode terminal is not transmitted to an adjacent terminal, but flows to the common electrode. The common electrode has a wide area and is made to be low-resistive and high-capacitive, such that the applied electrostatic charge is absorbed to reduce the voltage, thereby efficiently reducing the effect the electrostatic charge to the remaining row electrodes connected to the common electrode.

As described above, according to the present invention, a protection circuit can be formed to protect against excessive input voltage such as electrostatic charge applied to input terminals in the electro-optical device such an active panel utilizing nonlinear resistive elements without addition of fabrication steps, thereby preventing defect generated by electrostatic charge which would occur during the fabrication process after the completion of the product in the prior art and improving greatly the yield rate and reliability.

What is claimed is:

1. An electro-optical device comprising: input electrodes composed of a thin metallic film and arranged in a stripe pattern; a plurality of picture elements connected to the input electrodes and arranged in a matrix, each picture element being comprised of a nonlinear resistive switching element of two-terminal type, a picture electrode and electro-optical material; and a nonlinear resistive element having a nonlinear resistive film interposed between two electrodes connected between adjacent input electrodes and effective to protect the nonlinear resistive switching element of each picture element from damage caused by excessive electrical energy applied to the input electrodes.

2. An electro-optical device as claimed in claim 1, wherein the nonlinear resistive element comprises a plurality of nonlinear resistive members.

3. An electro-optical device as claimed in claim 2, wherein each of the nonlinear resistive members has a sectional structure identical to that of the nonlinear resistive switching element used in the picture element.

4. An electro-optical device comprising: input electrodes composed of a thin metallic film and arranged in a stripe pattern; a plurality of picture elements connected to the input electrodes and arranged in a matrix to define an area effective to exhibit an electro-optical effect, each picture element being comprised of a nonlinear resistive switching element of two-terminal type, a picture electrode and electro-optical material; a common electrode disposed outside the area of electro-optical effect; and a nonlinear resistive element connected between the common electrode and the respective input electrodes and effective to protect the nonlinear resistive switching element of each picture element from damage caused by excessive electrical energy applied to the input electrodes.

5. An electro-optical device as claimed in claim 4, wherein the nonlinear resistive element comprises a plurality of nonlinear resistive members.

6. An electro-optical device as claimed in claim 5, wherein each of the nonlinear resistive members has a sectional structure identical to that of the nonlinear resistive switching element used in the picture element.

7. A protection circuit for protecting a plurality of circuit elements from damage caused by excessive electrical energy, each of said circuit elements having a nonlinear resistive circuit element and having a terminal end, the protection circuit comprising: a plurality of nonlinear resistive elements each having a sectional structure identical to that of the nonlinear resistive circuit elements and connected in series with each other and between the terminal ends of the circuit elements such that a first nonlinear resistive element is connected between a first pair of consecutive terminal ends and each successive nonlinear resistive element is connected between each successive pair of consecutive terminal ends.

8. A protection circuit as in claim 7; wherein each of said nonlinear resistance elements comprises a plurality of nonlinear resistance members connected in series.

9. A protection circuit for protecting a plurality of circuit elements from damage caused by excessive electrical energy, each of said circuit elements having a nonlinear resistive circuit element and having a terminal end, the protection circuit comprising: a common electrode element; a plurality of nonlinear resistance elements each having a sectional structure substantially identical to that of the nonlinear resistive circuit elements and connected between said common electrode element and the terminal ends of the circuit elements such that a first nonlinear resistance element is connected between said common electrode element and a first terminal end and each successive nonlinear resistance element is connected between said common electrode element and a successive terminal end.

10. A protection circuit as in claim 9; wherein each of said nonlinear resistance elements comprises a plurality of nonlinear resistance members connected in series.

11. An electro-optical device, comprising: input electrodes composed of a thin metallic film and arranged in a stripe pattern; a plurality of picture elements connected to the input electrodes and arranged in a matrix, each picture element being comprised of a nonlinear resistive switching element of two-terminal type, a picture electrode and electro-optical material; and a nonlinear resistive element connected between adjacent input electrodes, each nonlinear resistive element having a sectional structure identical to that of the nonlinear resistive switching element of each picture element.

12. An electro-optical device according to claim 11; wherein each nonlinear resistive element comprises a plurality of nonlinear resistive members.

13. An electro-optical device comprising: input electrodes composed of a thin metallic film and arranged in a stripe pattern; a plurality of picture elements connected to the input electrodes and arranged in a matrix to define an area effective to exhibit an electro-optical effect, each picture element being comprised of a nonlinear resistive switching element of two-terminal type, a picture electrode and electro-optical material; a common electrode disposed outside the area of electro-optical effect; and a nonlinear resistive element connected between the common electrode and the respective input electrodes.

14. An electro-optical device according to claim 13; wherein each nonlinear resistive element comprises a plurality of nonlinear resistive members.

15. An electro-optical device according to claim 14, wherein each of the nonlinear resistive members has a sectional structure identical to that of the nonlinear resistive switching element used in the picture element.

* * * * *